United States Patent Office 3,204,002
Patented Aug. 31, 1965

3,204,002
PROCESS FOR PURIFYING TRICHLORO-MONOFLUOROETHYLENE
Eugene G. Teach, Lafayette, and Attila E. Pavlath, Berkeley, Calif., assignors to Stauffer Chemical Company, New York, N.Y., a corporation of Delaware
No Drawing. Filed Feb. 16, 1962, Ser. No. 173,814
6 Claims. (Cl. 260—653.3)

This invention relates to the purification of trichloromonofluoroethylene.

As is known in the prior art, trichloromonofluoroethylene may be prepared by treating $CCl_3CCl_2F$ with zinc in the presence of methyl alcohol according to the following reaction:

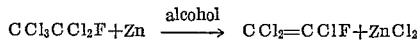

$$CCl_3CCl_2F + Zn \xrightarrow{alcohol} CCl_2=CClF + ZnCl_2$$

Another method of preparing trichloromonofluoroethylene is the fluorination of tetrachloroethylene at 500–750° C. using gaseous HF in the presence of an aluminum fluoride catalyst as disclosed in U.S. Patent 2,670,388.

The normally purified trichloromonofluoroethylene which results from such processes is subject to oxidation and usually contains impurities caused by oxidation. Upon standing, trichloromonofluoroethylene will further oxidize and develop an acidic condition which cannot be tolerated in many applications; as for in dry cleaning applications.

By the practice of the present invention, this impurity which is the result of oxidation is removed either at the time of preparation and before any oxidation inhibitor is added or even after long storage when any oxidation inhibitor added has ceased functioning and the trichloromonofluoroethylene has become quite acidic.

Thus, it is an object of the present invention to purify $CCl_2=CClF$ of oxidation impurities when prepared so to maximize the period it can be maintained stable.

It is a further object of the present invention to reclaim such spent, highly impure, acidic $CCl_2=CClF$.

These and further objects will be readily apparent to those skilled in the art from the detailed discussion to follow.

Trichloromonofluoroethylene will undergo a light-catalyzed oxidation and become acidic. The exact nature of the contaminating oxidation reaction products is not known. However, by examination of unpurified $CCl_2=CClF$ and purified $CCl_2=CClF$ by gas-liquid partition chromatography it was found that a small peak which came off prior to main $CCl_2=CClF$ peak in the contaminating compound was removed by means of the present invention. Exposure of a sample of $CCl_2=CClF$ to strong ultraviolet radiation and air produced a contaminated solvent containing a larger amount of this impurity as was verified by gas-liquid chromatography. This impurity is believed to be the epoxide of trichloromonofluoroethylene since this is believed to be the first product of oxidation. Furthermore, these epoxides are known to be unreactive toward aqueous base and indeed aqueous base did not remove the peak in question.

The purification of trichloromonofluoroethylene as taught by the present invention is commenced by the addition of a tertiary amine to the contaminated material. The tertiary amines do not affect the trichloromonofluoroethylene itself, but form a precipitate with the contaminant. This mixture containing the precipitate is then treated with aqueous HCl which dissolves and removes the precipitate as well as any excess amine. Since the aqueous HCl is immiscible with the $CCl_2=CClF$ it is a simple operation to remove the aqueous HCl containing the dissolved precipitate and excess amine from the purified material.

An alternative procedure, which is the preferred procedure, is to wash the precipitated trichloromonofluoroethylene solution with water and decant prior to treating with HCl. In this manner the precipitate dissolves in the water and is removed by decanting and thus less HCl is necessary in the HCl washing step.

The thus purified trichloromonofluoroethylene is then dried using any of the well known drying agents, such as flake sodium hyroxide, calcium chloride or the like.

Pure trichloromonofluoroethylene is a water white liquid. However, a clear yellow coloring may be present after purification by the process of the present invention which is easily removed by washing with a sodium hydroxide solution and decanting to yield a clear, colorless liquid.

Trichloromonofluoroethylene that has been purified by the method of the present invention does not form a precipitate with the various amine compounds used as stabilizers therefor, as for example tetramethylethylenediamine (TMEDA) which can also be used as the tertiary amine of the initial purification step. For example, with contaminated $CCl_2=CClF$ purified by treatment with sodium hydroxide alone, the stabilizer or inhibitor TMEDA at 100 p.p.m. was used and gave protection to the $CCl_2=CClF$ under greatly accelerated test conditions for 7 to 19.5 hours depending on the amount of impurity. Samples of $CCl_2=CClF$ purified with pyridine as the tertiary amine (pyridine is the preferred tertiary amine due to its low cost, commercial availability) by the process of the present invention and treated with 100 p.p.m. TMEDA resulted in complete stabilization for up to 96 hours under the same accelerated conditions.

We claim:
1. The process for purifying trichloromonofluoroethylene containing an oxidation reaction contaminant comprising: treating said contaminated $CCl_2=CClF$ with a tertiary amine selected from the group consisting of pyridine and tetramethylethylenediamine and washing the resultant liquid with aqueous hydrochloric acid.

2. The process for purifiying $CCl_2=CClF$ containing an oxidation reaction contaminant comprising: treating said contaminated $CCl_2=CClF$ with a tertiary amine selected from the group consisting of pyridine and tetramethylethylenediamine and washing the resultant liquid with water and thereafter with hydrochloric acid.

3. The process for purifying $CCl_2=CClF$ containing an oxidation reaction contaminant comprising: treating said contaminated $CCl_2=CClF$ with a tertiary amine selected from the group consisting of pyridine and tetramethylethylenediamine to precipitate the contaminant; then treating the resulting solution with water to dissolve said precipitated contaminant, separating said contaminant-containing water from said $CCl_2=CClF$, thereafter treating said $CCl_2=CClF$ with hydrochloric acid, separating said hydrochloric acid and then drying the resultant $CCl_2=CClF$.

4. The process for purifying trichloromonofluoroethylene containing an oxidation reaction contaminant comprising: treating said contaminated $CCl_2=CClF$ with pyridine and washing the resultant liquid with aqueous hydrocholric acid.

5. The process for purifying $CCl_2=CClF$ containing an oxidation reaction contaminant comprising: treating said contaminated $CCl_2=CClF$ with pyridine and washing the resultant liquid with water and thereafter with hydrochloric acid.

6. The process for purifying $CCl_2=CClF$ containing an oxidation reaction contaminant comprising: treating said material with pyridine to precipitate said contaminant, dissolving said contaminant in water, separating said contaminant containing water from said material, treating said resultant material with hydrochloric acid which is immiscible therewith, separating said hydrochloric acid phase, and thereafter treating said material with sodium hydroxide.

References Cited by the Examiner

UNITED STATES PATENTS

| | | | |
|---|---|---|---|
| 2,738,371 | 3/56 | Parmelee | 260—653 |
| 3,004,075 | 10/61 | Marcali | 260—653.3 |
| 3,022,357 | 2/62 | Kaspar | 260—653.3 |

LEON ZITVER, *Primary Examiner.*

JOSEPH R. LIBERMAN, *Examiner.*